(12) United States Patent
Moon et al.

(10) Patent No.: US 11,645,699 B2
(45) Date of Patent: May 9, 2023

(54) OPERATING METHOD FOR PROVIDING INFORMATION RELATED TO SERVICE AND ELECTRONIC APPARATUS SUPPORTING THEREOF

(71) Applicant: Coupang Corp., Seoul (KR)

(72) Inventors: Bo Ra Moon, Seoul (KR); So Hee Kim, Seoul (KR); Tae Hoa Lee, Seoul (KR); Sun Hee Hwang, Seoul (KR); Jeong Seok Oh, Seoul (KR); Sang Jin Ko, Seoul (KR); Sung Jin Park, Seoul (KR); Sang Hee Ahn, Seoul (KR); Sang Ho Lee, Seoul (KR); Se Hwan Chung, Seoul (KR); Hye Jin Oh, Seoul (KR); Yeo Joo Yang, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/565,306

(22) Filed: Dec. 29, 2021

(65) Prior Publication Data
US 2023/0034894 A1    Feb. 2, 2023

(30) Foreign Application Priority Data
Jul. 30, 2021    (KR) ................ 10-2021-0100995

(51) Int. Cl.
*G06Q 30/00*    (2023.01)
*G06Q 30/0601*    (2023.01)
(Continued)

(52) U.S. Cl.
CPC ....... *G06Q 30/0633* (2013.01); *G06Q 10/087* (2013.01); *G06Q 30/0283* (2013.01); *G06Q 30/0641* (2013.01)

(58) Field of Classification Search
CPC ............ G06Q 30/00; G06Q 30/0601; G06Q 30/0623; G06Q 30/0641
See application file for complete search history.

(56) References Cited

U.S. PATENT DOCUMENTS 6,311,178 B1 * 10/2001 Bi ................. G06F 16/24578
707/948
8,352,382 B1 * 1/2013 Katta ................. G06Q 50/28
705/330

(Continued)

FOREIGN PATENT DOCUMENTS

JP    2008265894 A    11/2008
JP    2012224408 A    11/2012
(Continued)

OTHER PUBLICATIONS

Schrotenboer, Albert H., et al. "Order picker routing with product returns and interaction delays." International Journal of Production Research 55.21 (2017): 6394-6406. (Year: 2017).*

(Continued)

*Primary Examiner* — Christopher B Seibert
(74) *Attorney, Agent, or Firm* — Banner & Witcoff, Ltd.

(57) ABSTRACT

A method of providing information related to a service by an electronic apparatus, which includes acquiring order information for an item list including one or more items, performing an operation for picking work corresponding to the acquired order information, and when picking of all the one or more items included in the item list for the acquired order information is completed, performing an operation for pickup location assignment, is provided.

18 Claims, 12 Drawing Sheets

(51) Int. Cl.
*G06Q 10/087* (2023.01)
*G06Q 30/0283* (2023.01)

(56) References Cited

U.S. PATENT DOCUMENTS

| | | | | |
|---|---|---|---|---|
| 8,498,974 B1* | 7/2013 | Kim | ............... | G06F 16/245 |
| | | | | 707/706 |
| 2001/0056386 A1* | 12/2001 | O'Halloran | ......... | G06F 11/2289 |
| | | | | 705/28 |
| 2002/0055912 A1* | 5/2002 | Buck | ............... | G06Q 30/02 |
| | | | | 705/76 |
| 2002/0077937 A1* | 6/2002 | Lyons | ............... | G06Q 30/06 |
| | | | | 705/28 |
| 2006/0074762 A1* | 4/2006 | Heising | ............. | G06Q 30/0641 |
| | | | | 705/26.8 |
| 2007/0011172 A1* | 1/2007 | Ruul | ............... | G06Q 30/00 |
| | | | | 705/26.1 |
| 2007/0078725 A1* | 4/2007 | Koszewski | ........ | G06Q 30/0635 |
| | | | | 705/26.81 |
| 2007/0112730 A1* | 5/2007 | Gulli | ............... | G06F 16/951 |
| 2007/0174144 A1* | 7/2007 | Borders | ............. | G06Q 10/0837 |
| | | | | 705/26.81 |
| 2007/0208598 A1* | 9/2007 | McGrady | ............... | G16H 15/00 |
| | | | | 705/3 |
| 2008/0065514 A1* | 3/2008 | Eaton | ............... | G06Q 30/02 |
| | | | | 705/27.1 |
| 2008/0078828 A1* | 4/2008 | Helmin | ............... | G16H 70/40 |
| | | | | 235/375 |
| 2009/0138398 A1* | 5/2009 | Cole | ............... | G06Q 40/00 |
| | | | | 705/42 |
| 2009/0164333 A1* | 6/2009 | Rothman | ............. | G06Q 40/00 |
| | | | | 705/26.1 |
| 2009/0234848 A1* | 9/2009 | Leff | ............... | G06F 16/951 |
| | | | | 707/999.005 |
| 2010/0138281 A1* | 6/2010 | Zhang | ............... | G06Q 10/087 |
| | | | | 705/28 |
| 2010/0169361 A1* | 7/2010 | Chen | ............... | G06F 16/285 |
| | | | | 707/769 |
| 2013/0211977 A1* | 8/2013 | Lyon | ............... | G06Q 10/0875 |
| | | | | 705/29 |
| 2013/0317642 A1* | 11/2013 | Asaria | ............... | G06Q 10/08 |
| | | | | 700/216 |
| 2016/0129587 A1 | 5/2016 | Lindbo et al. | | |
| 2018/0029797 A1 | 2/2018 | Hance et al. | | |
| 2019/0005567 A1 | 1/2019 | Zhu | | |

FOREIGN PATENT DOCUMENTS

| | | |
|---|---|---|
| KR | 101500849 B1 | 3/2015 |
| KR | 10-2015-0104768 A | 9/2015 |
| KR | 10-2016-0001579 A | 1/2016 |
| KR | 101756594 B1 | 7/2017 |
| KR | 101832617 B1 | 2/2018 |
| KR | 10-2018-0136295 A | 12/2018 |
| KR | 102130457 B1 | 7/2020 |
| KR | 102217855 B1 | 2/2021 |
| KR | 10-2021-0046722 A | 4/2021 |
| TW | 201905778 A | 2/2019 |
| TW | 202009816 A | 3/2020 |

OTHER PUBLICATIONS

Henn, Sebastian. "Algorithms for on-line order batching in an order picking warehouse." Computers & Operations Research 39.11 (2012): 2549-2563. (Year: 2012).*

Nov. 2, 2021—Office Action in KR App 10-2021-0100995.

* cited by examiner

OPERATING METHOD FOR PROVIDING INFORMATION RELATED TO SERVICE AND ELECTRONIC APPARATUS SUPPORTING THEREOF

RELATED APPLICATION INFORMATION

The present application claims priority to and the benefit of Korean Patent Application No. 10-2021-0100995, filed on Jul. 30, 2021, and is incorporated by reference herein in its entirety.

TECHNICAL FIELD

The present disclosure relates to a method and an apparatus for providing information related to a service, and more particularly, to a method of providing information related to a delivery service for an item ordered by a user and an electronic apparatus therefor.

DESCRIPTION OF THE RELATED ART

With the development of electronic technology, e-commerce has become a field of shopping. Customers may purchase items online without going directly to a shopping mall or market, and the items purchased online are delivered to delivery destinations requested by the customers.

In the case of e-commerce, since the provision of detailed and accurate information on products has a remarkable effect on service satisfaction, various methods for providing more detailed and accurate information are being discussed.

In this regard, reference may be made to related art documents such as KR101756594B1 and KR101500849B1.

DISCLOSURE OF THE INVENTION

Technical Goals

An aspect provides an electronic apparatus for providing information related to a service, which is capable of providing information related to a delivery service for an item ordered by a user.

The technical matters to be solved by the present disclosure are not limited to the above-mentioned technical matters and other technical matters which are not mentioned can be clearly understood by those skilled in the art to which the present disclosure pertains from the following description.

Technical Solutions

According to an aspect, there is provided a method of operating an electronic apparatus for providing information related to a service and an electronic apparatus supporting the same.

According to an aspect, there is provided a method of providing information related to a service by an electronic apparatus may include acquiring order information for an item list including one or more items, providing information on a first item included in the one or more items and first location information on a location of the first item being stowed to a terminal of a first picker to which first picking work corresponding to the order information is assigned, acquiring a first input corresponding to the first location information from the terminal of the first picker, in response to the first input, providing detailed information on the first item and quantity information on the first item corresponding to the order information to the terminal of the first picker, acquiring first picking completion information on the first item from the terminal of the first picker, and when picking of all the one or more items is completed, providing first pickup request information for assigning a pickup location for the order information to the terminal of the first picker, assigning a first pickup location for the order information based on a second input of the first picker corresponding to the first pickup request information, and providing the order information and information on the assigned first pickup location to a terminal of a courier.

In an example embodiment, the first picking completion information may include information on which the first picker inputs a picking quantity of the first item in response to the quantity information on the first item, and information on which the first picker inputs one of information for confirming picking of the first item and information for canceling the picking of the first item based on the inputted picking quantity.

In an example embodiment, the information on the first item and the first location information may be provided based on first sequence information on the first item of sequence information on the one or more items.

In an example embodiment, the sequence information may be determined based on a weight of each of the one or more items.

In an example embodiment, the sequence information may be determined based on a minimum picking path for the first picking work.

In an example embodiment, the method of providing information related to a service may further include when information for confirming the picking of the first item is input based on the first picking completion information, providing information on a second item having second sequence information following the first sequence information and second location information on a location of the second item being stowed to the terminal of the first picker, acquiring a third input corresponding to the second location information from the terminal of the first picker, and in response to the third input, providing detailed information on the second item and quantity information on the second item corresponding to the order information to the terminal of the first picker, and acquiring second picking completion information on the second item from the terminal of the first picker.

In an example embodiment, when picking completion information on all the one or more items are obtained, the picking of the one or more items may be completed.

In an example embodiment, the method of providing information related to a service may further include when information for canceling the picking of the second item is input based on the second picking completion information, providing picking cancellation information for canceling the first picking work to the terminal of the first picker. The first picking work may be canceled according to a fourth input of the first picker corresponding to the picking cancellation information.

In an example embodiment, the method of providing information related to a service may further include confirming a picking quantity input for the first item through the first picking completion information, configuring a quantity, which is obtained by subtracting the input picking quantity from an initial stock quantity of the first item, as a current stock quantity for the first item, and configuring an initial stock quantity of the second item as a current stock quantity for the second item.

In an example embodiment, when a status of the first item for which the picking is completed is determined as being normal based on the input picking quantity, the current stock quantity for the first item may be reconfigured to be equal to the initial stock quantity of the first item.

In an example embodiment, when the detailed information on the first item and the quantity information on the first item are provided, summary information on the second item may be displayed in a lower part of a region in which the detailed information on the first item and the quantity information on the first item are displayed based on the second sequence information.

In an example embodiment, the method of providing information related to a service may further include providing information on an elapsed real time from a timing point when the order information is acquired to the terminal of the first picker.

In an example embodiment, when picking of an item is not confirmed within a predetermined period of time after information on the item having high priority sequence information among the one or more items and location information on a location of the item being stowed are provided, the first picking work may be canceled.

In an example embodiment, the one or more items may correspond to at least some items included in the item list, and the method of providing information related to a service may further include providing information on a third item, which is included in the remaining some items, excluding the at least some items, of the item list, and third location information on a location of the third item being stowed to a terminal of a second picker to which second picking work corresponding to the order information is assigned, acquiring a fifth input corresponding to the third location information from the terminal of the second picker, and in response to the fifth input, providing detailed information on the third item and quantity information on the third item corresponding to the order information to the terminal of the second picker, and acquiring third picking completion information on the third item from the terminal of the second picker. In an example embodiment, the method of providing information related to a service may further include when picking of all the remaining some items is completed, providing guide information on the first pickup location to the terminal of the second picker based on that the first pickup location is assigned to the order information.

In an example embodiment, the method of providing information related to a service may further include when picking of all the remaining some items is completed, providing pickup request information for assigning a pickup location for the order information to the terminal of the second picker based on that the first pickup location is not assigned for the order information, assigning a second pickup location for the order information based on a sixth input of the second picker corresponding to the second pickup request information, and providing the order information and information on the assigned second pickup location to the terminal of the courier.

In an example embodiment, the method of providing information related to a service may further include after the second pickup request information is provided and before the sixth input of the second picker is acquired, when the first pickup location is assigned based on the second input of the first picker corresponding to the first pickup request information, providing guide information on the first pickup location to the terminal of the second picker in response to the sixth input of the second picker.

In an example embodiment, information for informing whether both the first picking work and the second picking work are completed may be provided to the terminal of the courier.

According to an aspect, there is provided an electronic apparatus for providing information related to a service may include a processor, and one or more memories configured to store one or more instructions. When executed, the one or more instructions may control the processor to perform acquiring order information for an item list including one or more items, providing information on a first item included in the one or more items and first location information on a location of the first item being stowed to a terminal of a first picker to which first picking work corresponding to the order information is assigned, acquiring a first input corresponding to the first location information from the terminal of the first picker, in response to the first input, providing detailed information on the first item and quantity information on the first item corresponding to the order information to the terminal of the first picker, acquiring first picking completion information on the first item from the terminal of the first picker, and when picking of all the one or more items is completed, providing first pickup request information for assigning a pickup location for the order information to the terminal of the first picker, assigning a first pickup location for the order information based on a second input of the first picker corresponding to the first pickup request information, and providing the order information and information on the assigned first pickup location to a terminal of a courier.

The above-described various example embodiments of the present disclosure are merely some of the an example embodiment of the present disclosure, and various example embodiments in which the technical features of the various example embodiments of the present disclosure are reflected can be derived and understood by those skilled in the art based on a detailed description which will be made below.

Effects

According to the present disclosure, there is proposed a method in which an electronic apparatus providing information related to a service provides information for a delivery service for an item ordered by a user, and thus the method has a technical effect in terms of achieving service usage convenience of the user.

The effects obtained by the present disclosure is not limited to the above-mentioned effects and other effects which are not mentioned can be clearly understood by those skilled in the art to which the present disclosure pertains from the above description.

DETAILED DESCRIPTION FOR CARRYING OUT THE INVENTION

The following example embodiments are implemented by combining components and features of various example embodiments in a predetermined form. Each component or each feature may be considered as an option unless explicitly stated otherwise. Each component or each feature may be implemented in the form of not being combined with other components or features. Alternatively, various embodiments may be implemented by combining some of the components and the features. An order of operations described in various embodiments may be changed. Some of components or features of any one embodiment may be included in another embodiment or may be replaced with a component or feature corresponding to another embodiment.

In the description of the accompanying drawings, procedures or steps which may obscure the gist of various embodiments are not described, and procedures or steps that can be understood at the level of a person of ordinary skilled in the art are also not described.

Throughout this disclosure, when an element is referred to as "comprising" or "including" a component, it refers that the element can further include other components, not excluding the other components unless specifically stated otherwise. In addition, the term "~part," "~unit," "~module," or the like disclosed herein means a unit for processing at least one function or operation, and this unit may be implemented by hardware, software, or a combination of hardware and software. In addition, terms "a or an," "one," "the" and similar related terms may be used meanings including both the singular form and the plural form in the context describing various embodiments (in particular, in the context of the appended claims), unless otherwise indicated in the specification or clearly contradicted by the context.

Hereinafter, exemplary examples according to various embodiments will be described in detail with reference to the accompanying drawings. The detailed description to be made below together with the accompanying drawings is intended to describe exemplary examples of various embodiments, and is not intended to represent only embodiments in which the present disclosure can be practiced.

In addition, specific terms used in various embodiments are provided to help understanding of various embodiments, and the use of these specific terms can be changed to other forms without departing from the technical spirit of the various embodiments.

Figure 1:
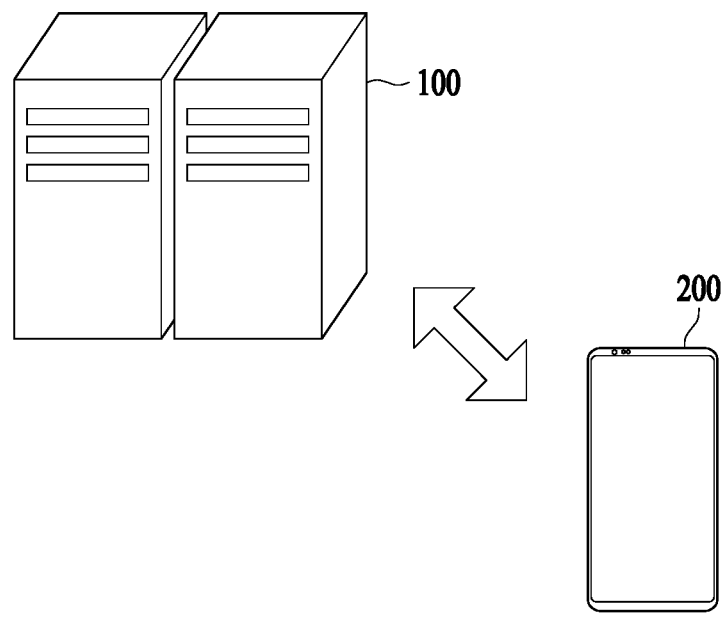
FIG. 1 is a diagram for describing a system for providing information related to a service, in which a method of operating an electronic apparatus for providing a service related information is implementable according to various example embodiments.

FIG. 1 is a diagram for describing a system for providing information related to a service, in which a method of operating an electronic apparatus for providing a service related information is implementable according to various example embodiments.

Referring to FIG. 1, the system for providing information related to a service according to various embodiments may be implemented in various types of electronic apparatuses. For example, the system for providing information related to a service may be implemented in a server device 100 and a user device 200. In other words, the server device 100 and the user device 200 may perform operations according to various embodiments of the present disclosure based on the system for providing information related to a service, which is implemented in each of the server device 100 and the user device 200. Meanwhile, the system for providing information related to service according to various embodiments is not limited to that shown in FIG. 1 and may be implemented in more various electronic apparatuses and servers.

The server device 100 according to various embodiments may be a device which performs wireless and wired communication with a plurality of user devices 200 and includes storage having a large storage capacity. For example, the server device 100 may be a cloud device interworking with a plurality of user devices.

The user device 200 according to various embodiments may be devices which are usable by an individual user, such as a desktop personal computer (PC), a tablet PC, and a mobile terminal. In addition the above devices, another electronic apparatuses performing similar functions may be used as the user device 200.

The system for providing information related to a service according to various embodiments may include various modules for operation. The modules included in the system for providing information related to a service may be a computer code or one or more instructions implemented to allow physical devices (for example, the server device 100 and the user device 200) in which the system for providing information related to a service is implemented (or included in the physical devices) to perform specified operations. In other words, the physical devices in which the system for providing information related to a service is implemented stores a plurality of modules in the form of computer codes in a memory, and when the plurality of modules stored in the memory are executed, the plurality of modules may allow the physical devices to perform specified operations corresponding to the plurality of modules.

Figure 2:
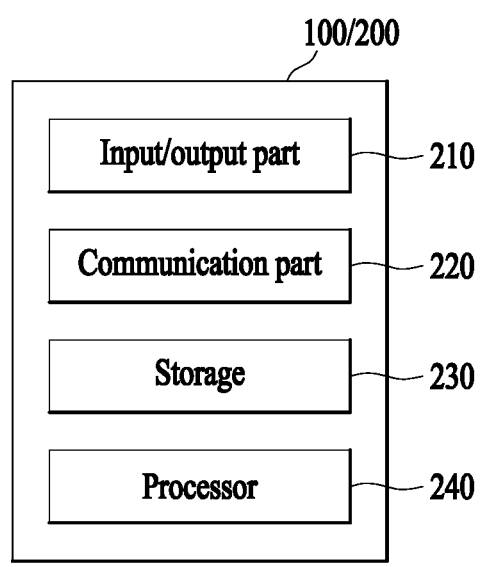
FIG. 2 is a diagram illustrating a configuration of a server device and a user device according to various example embodiments.

FIG. 2 is a diagram illustrating a configuration of the server device and the user device according to various example embodiments.

Referring to FIG. 2, the server device 100 and the user device 200 may each include an input/output part 210, a communication part 220, a storage 230, and a processor 240.

The input/output part 210 may be various interfaces or connection ports which receive a user input or output information to the user. The input/output part 210 may include an input module and an output module, and the input module receives the user input from the user. The user input may be made in various forms including a key input, a touch input, and a voice input. In addition to traditional keypads, keyboards, and mouses, examples of the input module capable of receiving the such user input may include a touch sensor for detecting a user touch, a microphone for receiving a voice signal, a camera for recognizing a gesture through image recognition, a proximity sensor including at least one of an illuminance sensor or an infrared sensor for detecting an approach of the user, a motion sensor for recognizing user motion through an acceleration sensor or a gyro sensor, and various types of input parts for sensing or receiving various types of user inputs, and the input module according to an example embodiment of the present disclosure may include at least one among the above-described devices. Here, the touch sensor may be implemented as a piezoelectric or capacitive touch sensor for detecting a touch through a touch panel or a touch film attached to a display panel, and an optical touch sensor for detecting a touch by an optical method. In addition to the above description, instead of a device for detecting a user input by itself, the input module may be implemented in the form of an input interface for connecting an external input device receiving a user input (a universal serial bus (USB) port, a personal system/2 (PS/2) port, and the like). In addition, the output module may output various types of information. The output module may include at least one among a display for outputting an image, a speaker for outputting a sound, a haptic device for generating a vibration, and other various types of output parts. In addition to the above description, the output module may be implemented in the form of a port-type output interface for connecting the above-described individual output parts.

For example, the display-type output module may display a text, a still image, and a moving image. The display may include at least one among a liquid crystal display (LCD), a light-emitting diode (LED) display, an organic light-emitting diode (OLED) display, a flat panel display (FPD), a transparent display. display), a curved display, a flexible display, a three-dimensional (3D) display, a holographic display, a projector, and other various types of devices capable of performing an image output function. The display may be in the form of a touch display which is integrally formed with the touch sensor of the input module.

The communication part 220 may communicate with another device. Accordingly, the server device 100 and the user device 200 may each transmit and receive information to and from another device through the communication part 220. For example, the server device 100 and the user device 200 may communicate with each other using the communication part 220 or communicate with other devices.

Here, the communication, that is, transmission and reception of data, may be performed in a wired or wireless manner. To this end, the communication part 220 may be formed as a wired communication module which accesses the Internet through a local area network (LAN), a mobile communication module which accesses a mobile communication network through a mobile communication base station and transmits and receives data, a short-distance communication module using a communication method of a wireless local area network (WLAN) such as wireless fidelity (Wi-Fi) or a communication method of a wireless personal area network (WPAN) such as Bluetooth or Zigbee, a satellite communication module using a global navigation satellite system (GNSS) such as a global positioning system (GPS), or a combination thereof.

The storage 230 may store various types of information. The storage 230 may store data temporarily or semi-permanently. For example, an operating program (operating system (OS)) for driving the server 100, data for hosting a web site, and data about a program or application (for example, web application) for generating Braille may be stored in the storage 230 of the server 100. In addition, the storage 230 may store the above-described modules in the form of computer codes.

Examples of the storage 230 include a hard disk drive (HDD), a solid state drive (SSD), a flash memory, a read-only memory (ROM), and a random access memory (RAM). The storage 230 may be provided as an embedded type storage or a detachable type storage.

The processor 240 controls overall operations of the server device 100 and the user device 200. To this end, the processor 240 may perform calculation and processing of various types of information and may control operations of components of the server 100. For example, the processor 240 may execute a program or application for providing information related to a service. The processor 240 may be implemented as a computer or a device similar to the computer according to hardware, software, or a combination thereof. In terms of hardware, the processor 240 may be provided in the form of an electronic circuit for processing an electrical signal and performing a control function. In terms of software, the processor 240 may be provided in the form of a program which drives the processor 240 formed of hardware. Meanwhile, in the following description, unless otherwise specified, the operations of the server device 100 and the user device 200 may be construed as being performed under the control of the processor 240. That is, when the modules implemented in the above-described system for providing information related to a service are executed, the modules may be construed that the processor 240 controls the server device 100 and the user device 200 to perform the following operations.

In summary, various example embodiments may be implemented through various parts. For example, various example embodiments may be implemented by hardware, firmware, software, or a combination thereof.

In the case of implementation by the hardware, a method according to various example embodiments may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In the case of implementation by the firmware or the software, a method according to various example embodiments may be implemented in the form of a module, a procedure, or a function, which performs functions or operations which will be described below. For example, a software code may be stored in a memory and driven by a processor. The memory may be located inside or outside the processor and may transmit and receive data to and from the processor by various known parts.

Hereinafter, various example embodiments will be described in more detail based on the above-described technical spirit. The above-described contents may be applied to various example embodiments which will be described below. For example, operations, functions, and terms not defined in various example embodiments, which will be described below, may be performed and described based on the above-described contents.

In the following description, various example embodiments on the premise that the server device 100 performs an operation of providing information related to a service will be described, according to the various example embodiments, the user device 200 acquiring the information related to a service from the server device 100 may output the information related to a service.

Figure 3:
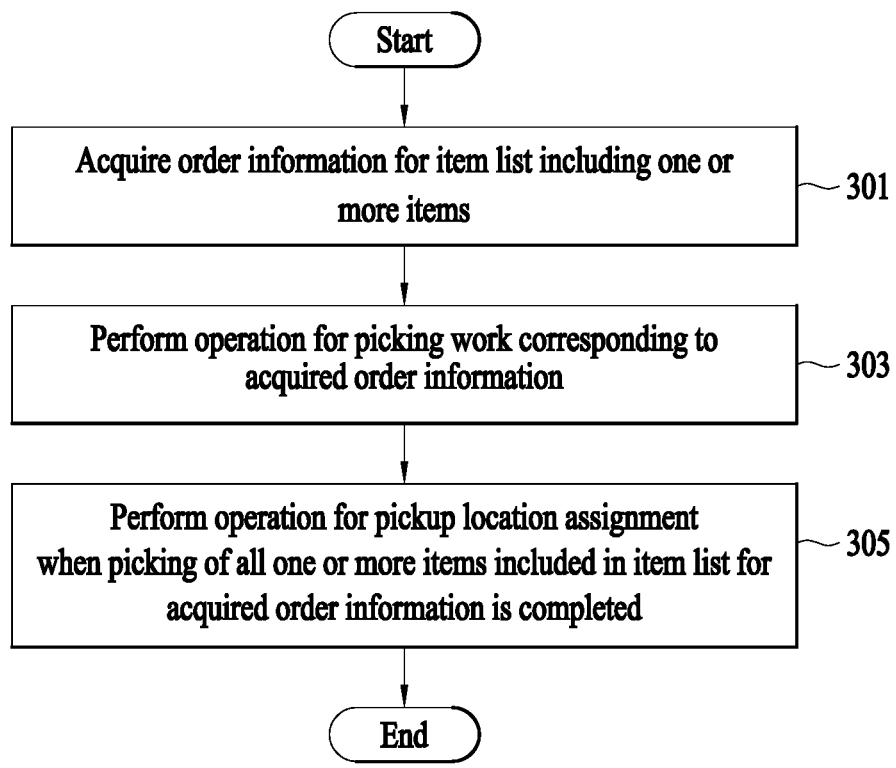
FIG. 3 is a flowchart illustrating a method of operating the server device for providing information related to a service according to various example embodiments.

FIG. 3 is a flowchart illustrating a method of operating a server device 100 for providing information related to a service according to various example embodiments.

According to various example embodiments, in operation 301, the server device 100 may acquire order information for an item list including one or more items.

For example, the order information for the item list may be order information acquired from a user using a service related to the server device 100.

For example, the service related to the server device 100 may correspond to a service in which the user orders an item and receives the item through delivery, and the item ordered by the user through the service may correspond to a food item. That is, the service is a service of providing the user with order and delivery for an item having a predetermined characteristic in storage or distribution and may be a service of providing order and delivery for an item, which has a relatively short available sales date and a characteristic of which a state of the item is difficult to be maintained when not delivered in a short period of time, for example, an item included in a food category, and of which 1) freshness or a state of the item should be kept, 2) an available sales date is present or the available sales date is shorter than an available sales date of another item, or 3) conditions related to a temperature and light should be satisfied for storage of the item.

For example, a user who uses a service related to the server device 100 may include one or more items to be ordered in a scheduled order list through the service and input his or her order information to the service through a purchase operation for the scheduled order list, and the server device 100 may acquire the input order information according to operation 301.

According to various example embodiments, in operation 303, the server device 100 may perform an operation for picking work corresponding to the acquired order information.

Here, the operation performed for the picking work corresponding to the order information acquired by the server device 100 may include operations in which the server device 100 provides information on a first item included in one or more items and first location information in which the first item is stowed to a terminal of a picker to which picking work corresponding to the order information is assigned, an input corresponding to the first location information is acquired from the terminal of the picker, detailed information on the first item and quantity information on the first item corresponding to the order information are provided to the terminal of the picker in response to the acquired input, and first picking completion information on the first item is acquired from the terminal of the picker.

First, the server device 100 may provide the information on the first item included in one or more items and the first location information in which the first item is stowed to the terminal of the picker to which the picking work corresponding to the acquired order information is assigned.

For example, the information on the first item may include name information on the first item and information on an ordered quantity of the first item.

For example, the first location information may include information on a code for inputting information for confirming a location at which the first item is stowed in a store, and the picker may perform an operation of scanning the code included in the first location information stowed through own terminal and may input a corresponding input to own terminal.

For example, in order to pick one or more items in the item list for the order information, the server device 100 may provide information on each item included in the one or more items and information on a location of each item being stowed to the terminal of the picker. That is, with respect to the first item included in the one or more items in the item list for the order information, the server device 100 may provide the information on the first item and first location information on a location of the first item being stowed to the picker. The item information and the item location information provided by the server device 100 may be information provided to the picker in units of each item until all the one or more items in the item list for the order information are picked.

For example, in order to pick the one or more items in the item list for the order information, a sequence of providing information on each item included in the one or more items and location information on each item may be set. To this end, sequence information on the one or more items may be determined. That is, in order to provide the information on each item and the location information on each item according to a predetermined item sequence, the server device 100 may determine the sequence information one the one or more items, and information on the first item and location information on the first item may be provided based on first sequence information on the first item included in the one or more items in the sequence information on the one or more items.

For example, the sequence information may be determined based on a weight of each of the one or more items in the item list for the order information, and more specifically, an item having a heavy weight may be set to have high priority sequence information. Consequently, a heavy item among the one or more items is picked first, and thus the one or more items are disposed from the bottom in the sequence of heaviness, thereby preventing an item from being damaged due to the heavy item being disposed at the top. In order to determine the sequence information based on a weight of each of the one or more items, the server device 100 may acquire information on each of the one or more items to compare and determine weights of the items included in each information.

As another example, the sequence information may be determined based on vulnerability or storage characteristics of the one or more items in the item list for the order information. Here, the vulnerability of the item may refer to a characteristic in which the item is sensitive to an external impact and thus it may be difficult for the item to maintain a state even with a small impact, and the storage characteristic of the item may refer to a characteristic in which the item is sensitive to an external impact, and thus separate management is required with respect to conditions related to prevention of an impact to the item. Specifically, when the item having the above-described vulnerability or storage characteristic is disposed downward, since a probability in which a current state of the item is difficult to be maintained is high, an item having vulnerability or a storage characteristic may be set to have low priority sequence information to be disposed as high as possible. The above-described item may correspond to electronic products or items made of glass, which require external impact protection. In particular, the vulnerability or storage characteristic may be considered even in a stowing process for the above-described item. For example, the item may be stowed in consideration of the vulnerability or storage characteristic of the item and a picking position of the item, which may be determined according to the vulnerability or storage characteristic.

Alternatively, as another example, the sequence information may be determined to minimize a path through which a picker picks one or more items in an item list for order information. That is, the sequence information may be determined based on a minimum picking path for overall picking work with respect to the one or more items. Thus, a picking path of the picker and a time required for picking may be minimized. In order to determine the sequence information based on the minimum picking path for the overall picking work with respect to the one or more items, the server device 100 may acquire information on each of the one or more items, determines location information on the item included in the information in a store, and derive the minimum picking path in the store for picking the one or more items based on the determined location information.

The server device 100 providing the first location information on the location of the first item being stowed may acquire an input corresponding to the first location information from the terminal of the picker.

For example, the input corresponding to the first location information acquired from the terminal of the picker may include an input in which the picker confirms that the first item is present in the first location information.

For example, the first location information may include information on a code for inputting information for confirming a location of the first item being stowed in a store, and the picker may perform an operation of scanning the code included in the first location information stowed through own terminal and may input a corresponding input to own terminal.

The server device 100 acquiring the input corresponding to the first location information may provide, in response to the acquired input, detailed information on the first item and quantity information on the first item corresponding to the order information to the terminal of the picker.

For example, the detailed information on the first item may include name information on the first item and image information on the first item. In addition, the detailed information on the first item may include information on a code or an identifier for inputting information for identifying the first item, and the picker may perform an operation of scanning the code or the identifier stowed through own terminal and perform an input corresponding to the code or the identifier. The quantity information on the first item is provided when the picker should perform the input as described above, and the detailed information on the first item may be set to allow the picker to input picking information on the first item.

For example, the quantity information on the first item corresponding to the order information may include information on a quantity ordered by the user for the first item in a service related to the server device 100.

For example, the picker who receives the detailed information on the first item and the quantity information on the first item corresponding to the order information may input the picking information on the first item through the own terminal.

Thereafter, the server device 100 may acquire first picking completion information on the first item from the terminal of the picker.

For example, the first picking completion information on the first item, which the server device 100 acquires from the terminal of the picker, may include information on a picking quantity input by the picker through the own terminal according to the quantity information on the first item corresponding to the order information. That is, the first picking completion information may include information on a picking quantity of the first item, which is input by the picker in response to the quantity information on the first item.

In addition, when the picking quantity of the first item is input by the picker, information input by the picker, which is either information for confirming the picking of the first item and information for canceling the picking of the first item according to the input picking quantity information, may be included in the first picking completion information. That is, when the picking quantity input by the picker satisfies the quantity information on the first item corresponding to the order information, the picker may input the information for confirming the picking of the first item through the first picking completion information. In this case, the picking of the first item may be confirmed. On the other hand, when there occurs a case in which it is difficult to pick the first item because stock of the first item is insufficient and thus the picking quantity input by the picker does not meet the quantity information on the first item corresponding to the order information or an item with a poor condition is included, the picker may input the information for canceling the picking of the first item through the first picking completion information. In this case, the picking of the first item may be canceled, and further, the picking of all the one or more items corresponding to the order information may be canceled.

In this case, as described above, when there occurs the case in which it is difficult to pick the first item, even when an stock quantity of the first item is insufficient when compared to the quantity information on the first item corresponding to the order information, the user may prefer to place an order even in the stock quantity, and alternatively, even when the quantity information on the first item corresponding to the order information is not satisfied because an item with a poor condition is included, the user may prefer to place an order even with a quantity of the first item in a normal state. To this end, when there occurs the case in which it is difficult to pick the first item and thus the quantity information on the first item corresponding to the order information is not satisfied, the server device 100 may be set to pick a current stock quantity of the first item, confirm the picking of the first item separately from an insufficient quantity of the first item, and proceed picking work for the next item first. That is, the picker may input a picking quantity by as much as the stock quantity for the first item, even when the input picking quantity is insufficient when compared to the quantity information on the first item corresponding to the order information, the picker may input information for confirming the picking of the first item as the first picking completion information. In response to the input of the information, the server device 100 may provide information on the next item and location information on a location of the next item being stowed to allow the picker to proceed picking work for the next item. In addition, during the above process, the server device 100 may set information on a state in which the quantity of the first item for which the picking is confirmed is insufficient and may perform management for transmitting or receiving the information on the state with the picker and a customer center.

Alternatively, before the picker inputs the information for confirming the picking of the first item or the information for canceling the picking of the first item according to the insufficient quantity through the first picking completion information, the server device 100 may be set to provide the user with information for requesting confirmation of whether to preferentially place an order even the insufficient quantity. In addition, when the user wants to cancel the order of the first item in response to the information for requesting confirmation of whether to preferentially order the insufficient quantity, the server device 100 may be set to provide information for selecting proceeding the picking of the remaining items, except for the first item, in the item list corresponding to the order information or provide information for canceling the picking for all the items included in the item list corresponding to the order information, that is, information for selecting cancellation of the order for all the items.

Specifically, when the quantity information on the first item corresponding to the order information is not satisfied due to the case in which the picking of the first item is difficult, the picker may perform an input providing information to the user for requesting confirmation of whether to preferentially place an order even the insufficient quantity, and based on the input, the server device 100 may transmit information for requesting confirmation of whether preferentially to place an order even the insufficient quantity to the user. When the user inputs to preferentially place an order even the insufficient quantity, the quantity information on the first item corresponding to the order information is changed to a current stock quantity of the store, the picking of the first item is performed according to the current stock quantity, and when the first item is picked by as much as the current stock quantity, the picking of the next item may be proceeded.

On the other hand, when the user inputs to not place an order for the insufficient quantity, the server device 100 may provide information for selecting proceeding the picking of the remaining items, except for the first item, in the item list corresponding to the order information or provide information for canceling the picking for all the items included in the item list corresponding to the order information, that is, information for selecting cancellation of the order for all the items. When the user selects to proceed the picking of the remaining items, except for the first item, from the list of items corresponding to the order information, the first item is deleted from the item list, and each information for picking an item of the next sequence of the first item is provided to the picker, and thus picking work for the remaining items may be performed. However, when the user selects cancellation of the picking of all the items included in the item list corresponding to the order information, that is, cancellation of the order for all the items, the picker may input information for canceling the picking of the first item through the first picking completion information. Accordingly, the picking of the first item may be canceled, and further, the picking of all the one or more items corresponding to the order information may be canceled.

According to the above-described embodiments, the first picking completion information on the first item, which the server device 100 acquires from the terminal of the picker, may be used as information for determining whether the server device 100 completes the picking of the first item according to the order quantity of the first item and performs an operation of providing the information on the next item and information on a location of the next item being stowed, information for determining whether to complete the picking of the first item with the current stock quantity based on a response of the user although the order quantity of the first item is not satisfied and perform an operation of providing the information on the next item and the information on the location of the next item being stowed, or information for determining whether to cancel the picking of the first item and cancel the picking of all the one or more items corresponding to the order information.

For example, when information for confirming the picking of the first item is input based on the first picking completion information on the first item acquired by the server device 100 from the terminal of the picker, the server device 100 may perform an operation of picking a second item having second sequence information following the first sequence information on the first item among the one or more items. That is, the server device 100 may provide information on the second item and second location information on a location of the second item being stowed to the terminal of the picker, acquire an input corresponding to the second location information from the terminal of the picker, provide detailed information on the second item and quantity information on the second item corresponding to the order information the terminal of the picker in response to the acquired input, perform an operation of acquiring second picking completion information on the second item from the terminal of the picker, and perform the same operation on the next item of a next sequence included in the one or more items according to whether the picking of the second item is confirmed or canceled.

For example, in order to inform the picker that the picking of the second item in a next sequence of the first item is scheduled in advance, when the server device 100 provides the detailed information on the first item and the quantity information on the first item to the terminal of the picker so as to acquire the first picking completion information on the first item, summary information on a second item in the next sequence of the first item may be stowed below a region in which the detailed information on the first item and the quantity information on the first item are stowed. Through the summary information on the second item, image information on the second item and the second location information on the location of the second item being stowed may be simply informed to the picker.

For example, when all of picking completion information on the items, which the server device 100 acquires from the terminal of the picker, are acquired with respect to each item included in the one or more items in the item list corresponding to the order information, the server device 100 may determine that the picking of all the one or more items is completed. That is, when the picking completion information on all the one or more items are obtained, the picking of the one or more items may be completed.

For example, after the server device 100 confirms the picking of the first item based on the first picking completion information on the first item acquired from the terminal of the picker, when information for canceling the picking of the second item is input based on second picking completion information on the second item having the second sequence information following the first sequence information on the first item, the server device 100 may provide picking cancellation information for canceling the picking work corresponding to the order information to the terminal of the picker. When an input of the picker corresponding to the picking cancellation information is present, the picking work corresponding to the order information may be canceled. That is, although the picker confirms the picking of the first item based on the first picking completion information on the first item having a preceding sequence of picking, when there occurs a case in which the picking of the second item is difficult because stock of the second item having a next sequence is insufficient to not satisfy an ordered quantity or an item with a poor condition is included, the picker may input information for canceling the picking of the second item based on the second picking completion information, the server device 100 may provide, in response to the information for canceling, picking cancellation information to the terminal of the picker so as to cancel the overall picking work, and may cancel the overall picking work according to an input of the picker corresponding to the picking cancellation information.

In this case, as described above, when there occurs a case in which picking of an item in a late sequence is difficult, and thus the overall picking work is canceled, the item in the preceding sequence, which is already picked, that is, the first item picked according to the picking quantity input according to the order quantity, may be designated as a separate problem item and managed through a separate problem zone. That is, since the item which is already picked may require a confirmation process of checking a state of the item according to the picking before returning the item to normal stock, the item which is already picked and stock quantity of the item may be managed separately.

In the above situation, the server device 100 may confirm a picking quantity input for the first item through the first picking completion information and set and manage a quantity, which is obtained by subtracting the input picking quantity from an initial stock quantity of the first item, as a current stock quantity of the item. That is, the server device 100 may separately manage the picking quantity which is already picked from the remaining stock quantity excluding the picking quantity, determine the remaining stock quantity as the current stock quantity, and separately manage the first item according to the picking quantity for which the picking is completed from first items according to the remaining stock quantity which are not picked and are fully disposed. On the other hand, since the second item to which the information for canceling the picking is input is not picked, there is no need to separately confirm the picking quantity input for the second item. Therefore, the initial stock quantity of the second item may be set and managed as the current stock quantity for the second item. That is, in consideration of the fact that the second item is not picked, the server device 100 may determine the second item, which is not picked and is fully disposed, according to the initial stock quantity as being the second item according to the current stock quantity and manage the second item.

When there occurs the case in which the picking of the second item in the late sequence is difficult, and thus the overall picking work is canceled, and when the first item in the preceding sequence, which is picked according to the picking quantity input according to the ordered quantity, is moved to a separate problem zone, the first item moved in this way undergoes a process of determining whether there is a problem in a state of item. When it is determined that there is no particular problem in the state of the first item which is picked based on the input picking quantity or determined that a state of item is normal, the first item may be stowed back to normal stock. In this case, since the overall picking work is canceled, the current stock quantity of the first item may be reconfigured to be equal to the original initial stock quantity by adding the input picking quantity again based on the quantity obtained by subtracting the input picking quantity from the initial stock quantity of the first item. When a problem occurs in the state of the first item according to some of the input picking quantity, the first item according to the remaining quantity without any problem may be stowed to the normal stock again. In this case, since the overall picking work is canceled, the current stock quantity of the first item may be reconfigured to a quantity to which the remaining quantity is added based on the quantity obtained by subtracting the input picking quantity from the initial stock quantity of the first item.

When the server device 100 performs an operation for the picking work corresponding to the order information according to operation 303, the server device 100 may provide information on an elapsed real time from a timing point when the order information is acquired to the terminal of the picker. Alternatively, when the server device 100 performs an operation for the picking work corresponding to the order information according to operation 303, the server device 100 may provide the terminal of the picker with information on an elapsed real time from a timing point when the picking work is assigned to the picker. That is, in terms of managing the picking work assigned to the picker, when the information for picking each item is provided, the server device 100 may provide information on the elapsed real time together to allow the picker to know in real time how much time is elapsed after order the information is acquired or the picking work is assigned.

When the server device 100 performs the operation for the picking work corresponding to the order information according to operation 303, when the input related to the picking of the item is not acquired within a predetermined time from the picker, the server device 100 may cancel the picking work. That is, when the server device 100 assigns the picking work for picking the one or more items included in the item list corresponding to the order information to the picker, when picking of a corresponding item is not confirmed within a predetermined period of time after the information on the item having the earliest sequence information among the one or more items and location information on a location of the corresponding item being stowed are provided, the server device 100 may be set to cancel the overall picking work for the one or more items.

Figure 4:
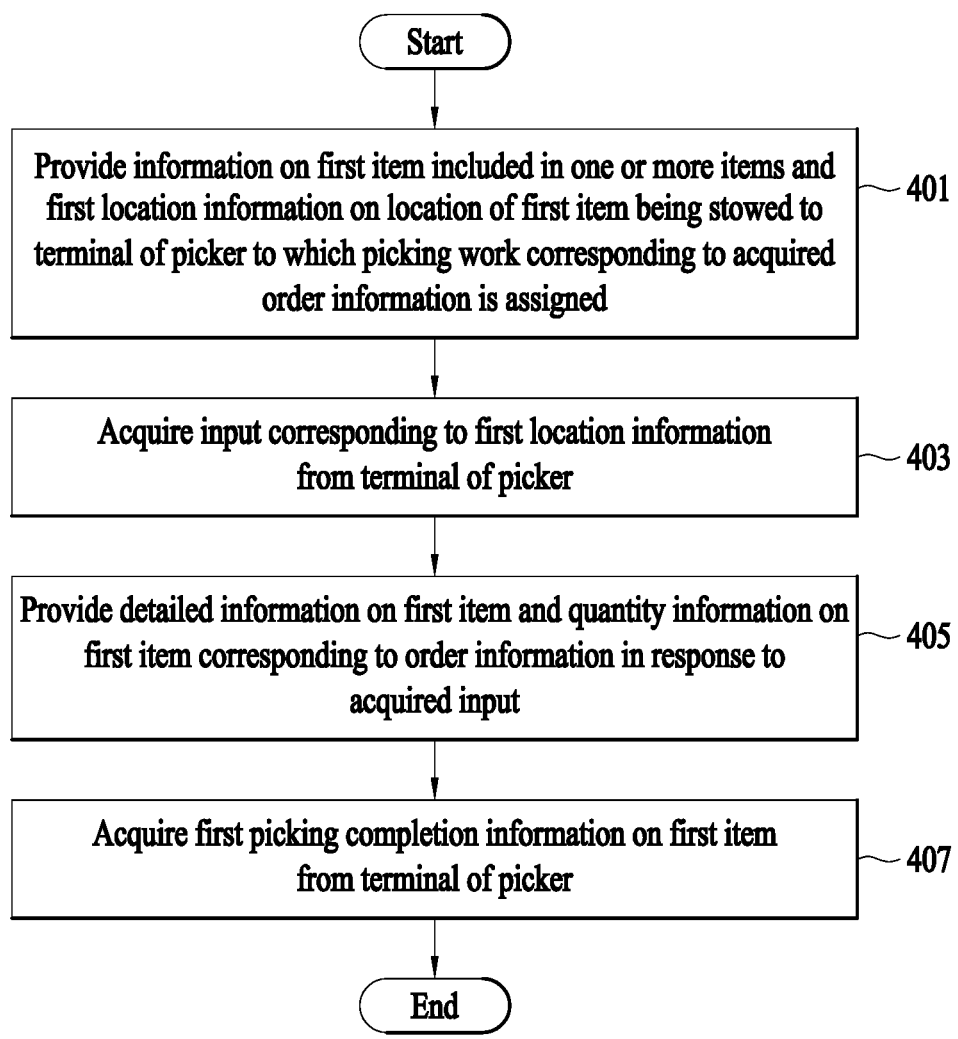
FIG. 4 is a flowchart illustrating a method in which the server device performs an operation for picking work corresponding to order information according to various example embodiments.

FIG. 4 is a flowchart illustrating a method in which a server device 100 performs an operation for picking work corresponding to order information according to various example embodiments.

As described above, for the picking work corresponding to the acquired order information, the server device 100 may provide the information on the first item included in one or more items and the first location information in which the first item is stowed to the terminal of the picker to which the picking work corresponding to the acquired order information is assigned (401).

In addition, the server device 100 may acquire the input corresponding to the first location information (403), in response to the acquired input, the server device 100 may provide the detailed information on the first item and the quantity information on the first item corresponding to the order information to the terminal of the picker (405).

Thereafter, the server device 100 may acquire the first picking completion information on the first item from the terminal of the picker (407) and complete the picking of the first item.

According to various example embodiments, in operation 305, when the picking of all the one or more items included in the item list for the acquired order information is completed, the server device 100 may perform an operation for pickup location assignment.

Here, when the picking of all the one or more items is completed, an operation of the server device 100 performing for the pickup location assignment may include an operation of providing pickup request information for assigning a pickup location for the order information to the terminal of the picker, an operation of allocating the pickup location for the order information based on the input of the picker corresponding to the pickup request information, and an operation of providing the order information and information on the assigned pickup location to a terminal of a courier.

First, when the picking for all the one or more items is completed, the server device 100 may provide the pickup request information for assigning the pickup location for the order information to the terminal of the picker.

For example, a case in which the picking of the one or more items is completed may refer to a case in which the picker inputs the picking completion information on all the one or more items corresponding to the picking work assigned to the picker and the server device 100 acquires the picking completion information on all the one or more items.

For example, the pickup request information for assigning the pickup location for the order information may correspond to information for confirming an input from the picker so as to designate a specific pickup location among one or more pickup locations corresponding to a store to which the picker belongs. For example, the server device 100 may provide information, which is capable of scanning a bar code or a quick response (QR) code which confirms a specific pickup location among one or more pickup locations corresponding to the store to which the picker belongs so as to designate the specific pickup location, to the terminal of the picker, and the picker may scan the provided bar code or QR code and receive assignment of the specific pickup location designated for the order information.

In addition, the server device 100 may assign a pickup location for the order information based on the input of the picker corresponding to the pickup request information.

For example, the input of the picker corresponding to the pickup request information is an input of scanning a bar code or a QR code, which is provided from the server device 100 and confirms a specific pickup location, so as to designate the specific pickup location among one or more pickup locations corresponding to the store to which the picker belongs.

Thereafter, the server device 100 may provide the order information and information on the assigned pickup location to the terminal of the courier.

For example, the server device 100 may provide the order information and the information on the assigned pickup location to the terminal of the courier, thereby informing the courier that the picking corresponding to the order information is completed and thus the courier may start delivery. To this end, in addition to the order information and the information on the assigned pickup location, the server device 100 additionally provide the terminal of the courier with information for informing that the picking for the order information is complete, user information corresponding to the order information, or information on delivery destination of the user.

Figure 5:
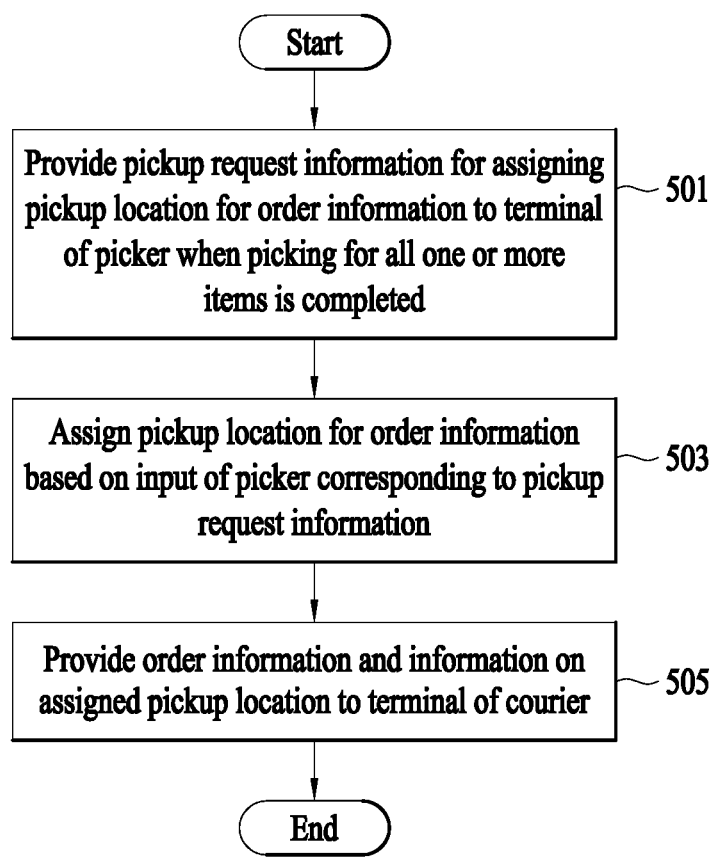
FIG. 5 is a flowchart illustrating a method in which the server device performs an operation for a pickup location assignment according to various example embodiments.

FIG. 5 is a flowchart illustrating a method in which the server device 100 performs an operation for a pickup location assignment according to various example embodiments.

As described above, when the picking for all the one or more items is completed for pickup location assignment, the server device 100 may provide the pickup request information for assigning the pickup location for the order information to the terminal of the picker (501). In addition, based on the input of the picker corresponding to the pickup request information, the server device 100 may assign a pickup location for the order information (503), provide the order information and information on the assigned pickup location to the terminal of the courier (505), and complete the pickup location assignment.

When the server device 100 acquires the order information, performs the picking work corresponding to the order information, and complete the picking work according to FIGS. 3 to 5, the operation of allocating the pickup location for the order information may correspond to an operation of performing any one among a plurality of picking works corresponding to the acquired order information, and an operation of allocating a pickup location in relation to the completion of the corresponding picking work. That is, the items included in the acquired order information acquired by the server device 100 may be divided into a plurality of pickers, instead of a single picker, according to weights, sizes, or quantities of the included items and be assigned to a plurality of picking work.

In this case, the above-mentioned one or more items included in the item list corresponding to the order information may correspond to some items among all the items included in the corresponding item list, and picking work for the remaining items, excluding some items among all the items, may be assigned together with the picking work for the one or more items. For example, first picking work for picking the one or more items, which correspond to at least some of all the items included in the item list corresponding to one piece of the order information, may be assigned to a first picker, and second picking work for picking some items, excluding at least some items among all the items, may be assigned to a second picker. Here, the one or more items, the first picking work, or the first picker may be understood as a concept corresponding to the one or more items, the picking work, or the picker, which is described in each example embodiment according to the operations of FIGS. 3 to 5.

With respect to the remaining some items, excluding the one or more items among all the items, and the second picking work for the remaining some items, similarly to operation 303 described above, the server device 100 may perform an operation of providing information on a third item included in the remaining some items and third location information on a location of the third item being stowed the terminal of the second picker to which the second picking work is assigned, an operation of acquiring an input corresponding to the third location information from the terminal of the second picker, an operation of providing, in response to the acquired input, detailed information on the third item and quantity information on the third item corresponding to the order information to the terminal of the second picker, and an operation of acquiring third picking completion information on the third item from the terminal of the second picker.

In this case, even when the plurality of picking work are assigned to the plurality of pickers in response to the one piece of the order information, in consideration that the one piece of the order information is requested from a single user, the server device 100 may designate one pickup location, without designating a plurality of pickup locations, in response to the plurality of picking work and set the designated one pickup location to correspond to all the plurality of picking work.

When the first picking work for picking the one or more items, which correspond to at least some items included in the item list corresponding to the order information, is completed by the first picker, a first pickup location corresponding to the order information may be assigned to the first picker. As described above, in a situation in which the first pickup location is assigned for the order information, when the second picking work for picking the remaining some items, excluding the at least some items among the all items, is completed by the second picker, the server device 100 may provide guide information on the assigned first pickup location to the terminal of the second picker without additionally allocating another pickup location for the order information, at least some of the items corresponding to the first picking work and the remaining some of the items corresponding to the second picking work are placed in the first pickup location, and then the courier may deliver the entire items corresponding to the one piece of the order information requested from the single user.

On the other hand, when the first pickup location corresponding to the order information is not yet assigned to the first picker performing the first picking work for picking one or more items corresponding to at least some items among all the items, since the server device 100 does not yet confirm the pickup location assigned for the order information, when the second picking work for picking the remaining some items, excluding the at least some items among all the items, is completed by the second picker, similar to operation 305, the server device 100 may perform an operation for pickup location assignment for the second picking work. When picking of all the remaining some items is completed, the server device 100 may perform an operation of providing pickup request information for allocating a pickup location for the order information to the terminal of the second picker, an operation of allocating a second pickup location for the order information based on the input of the second picker corresponding to the pickup request information, and an operation of providing the order information and information on the assigned second pickup location to the terminal of the courier.

In this case, although the picking of all the remaining some items is completed, and the server device 100 provides the pickup request information for allocating the second pickup location with respect to the order information to the terminal of the second picker, there may occur a case in which the first pickup location is assigned for the order information before the input of the second picker corresponding to the pickup request information is acquired. That is, although the second picker completes the second picking work for all the remaining some items, and the server device 100 provides the pickup request information for allocating the second pickup location for the order information to the terminal of the second picker, before an input of the second picker corresponding to the pickup request information is acquired, the first picker completes the first picking work for the at least some items, and the server device 100 provides pickup request information for allocating the first pickup location for the order information to the terminal of the first picker so that the first pickup location may be assigned and determined for the order information according to the input of the first picker corresponding to the pickup request information. In this case, when the input corresponding to the pickup request information for allocating the second pickup location, which is provided by the server device 100 to the terminal of the second picker, is acquired from the second picker, the server device 100 may provide the terminal of the second picker with information for informing that the first pickup location is assigned for the order information or guide information on the first pickup location.

When a plurality of picking work are assigned for the one piece of the order information, there is a need for the courier to confirm whether the items placed at one pickup location for delivery are items for which the plurality of picking work for the one piece of the order information are completed. Therefore, when the plurality of picking work are assigned for the one piece of the order information, and when information on one pickup location assigned for the one piece of the order information is provided to the courier, information for informing that the plurality of picking work are performed for the one piece of the order information may be provided to the courier, and information for informing whether all the plurality of picking work for the one piece of the order information are completed may also be provided.

According to the above-described example embodiments, it is obvious that each information for the server device 100 to perform an operation for the picking work corresponding to the order information and an operation for pickup location assignment may be combined in various forms and be provided to the picker or the courier.

FIGS. 6 to 12 are diagrams illustrating examples of a user interface/user experience (UI/UX) for providing information related to an item according to various example embodiments. For example, the examples of FIGS. 6 to 12 may be a UI/UX for the user device 200 for the picker according to the above-described example embodiments in FIGS. 3 to 5, and each example embodiment to be described below with reference to the drawings may be performed based on the above-described operation of the server device 100 with reference to FIGS. 3 to 5.

Figure 6:
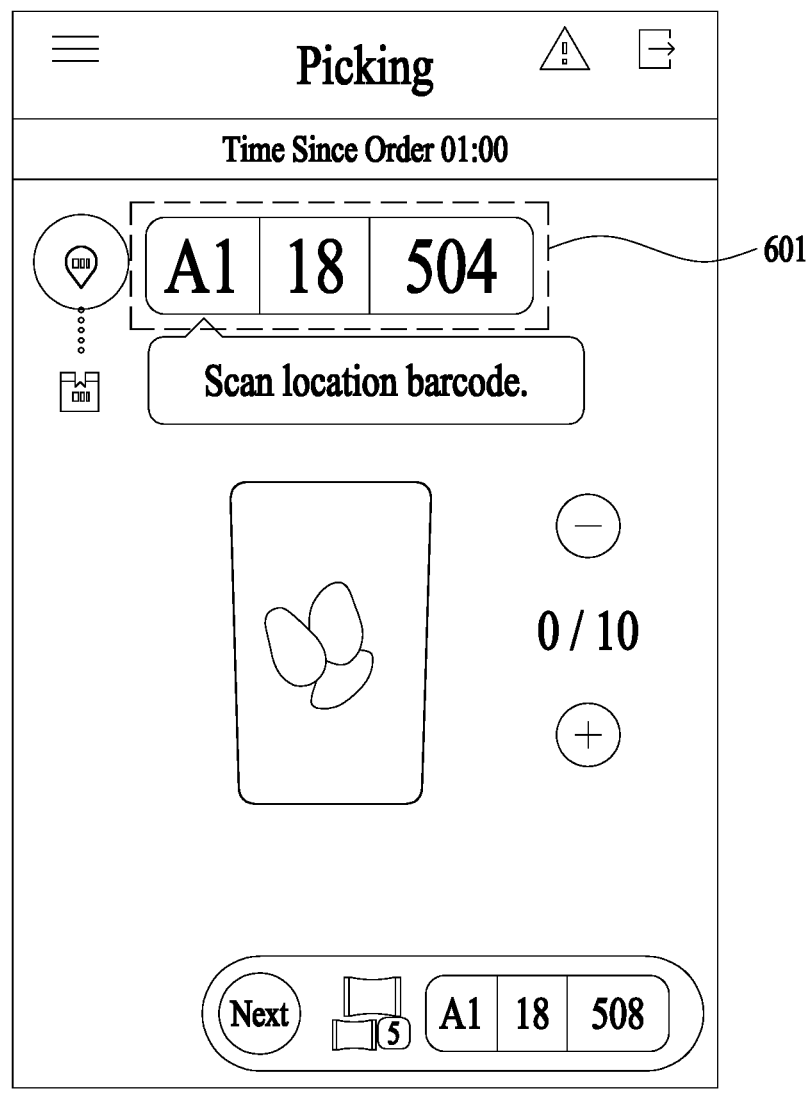
FIGS. 6 and 7 are diagrams illustrating examples in which the user device outputs information on an item of the server device to the user according to various example embodiments.
Figure 7:
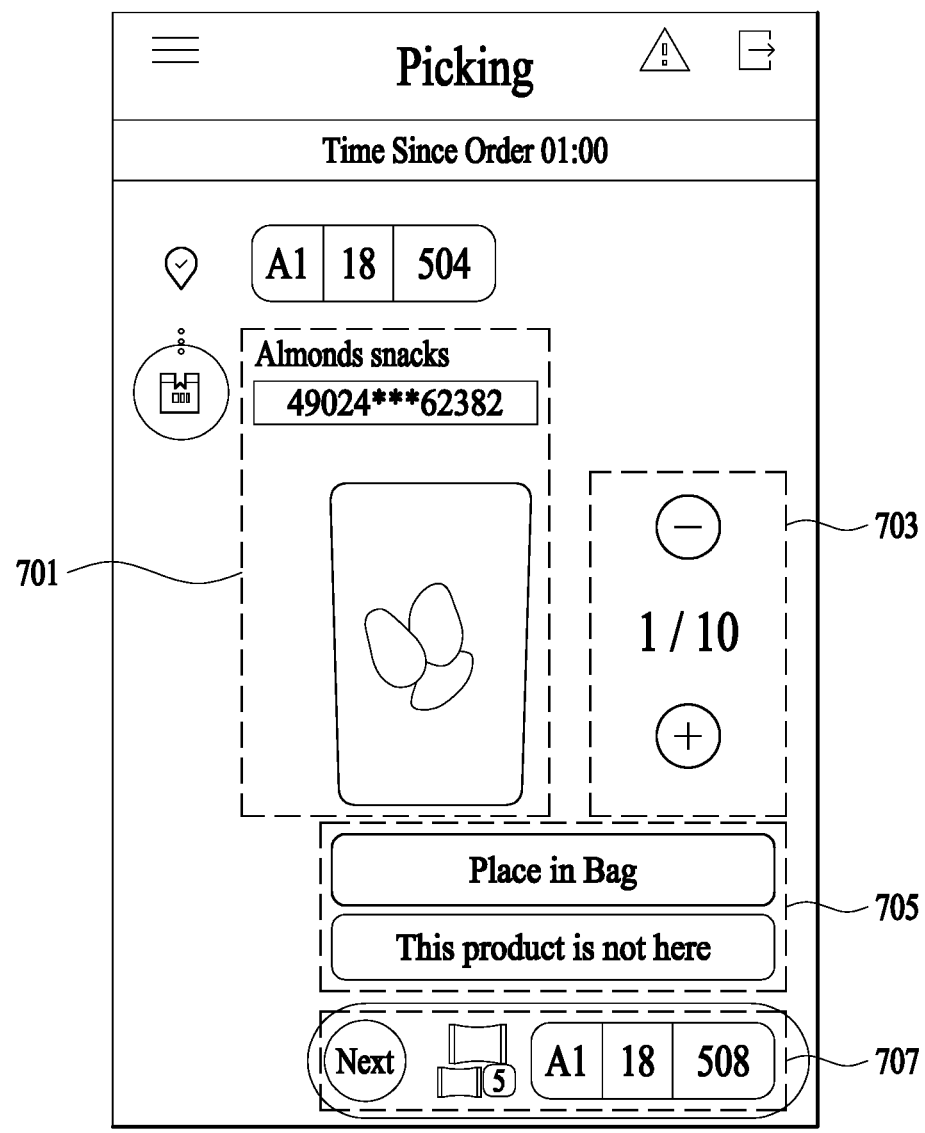

Specifically, each example of the UI/UX for the user device 200 the described below with reference to the drawings may be implemented such that, when the user device 200 receives input information from the user and transmits the input information to the server device 100, the server device 100 may provide information corresponding to the input information to the user device 200 based on the operations described with reference to FIGS. 3 to 5, and then the user device 200 may output the information corresponding to the input information. However, each example of the UI/UX described below with reference to the drawings is not limited to the above form and may be implemented in any form capable of implementing each example of the UI/UX. FIGS. 6 and 7 are diagrams illustrating examples in which a user device 200 outputs information on an item of the server device 100 to the user according to various example embodiments.

Referring to FIG. 6, the user device 200 outputs location information on a location of an item, which is included in the item list for the order information, being stowed (601) and also outputs information for informing scanning of the location information. The location information on the item provided in FIG. 6 is set to a code of "A1 18 504" so that the picker may perform an input of scanning the code through the user device 200. When the scanning of the code is completed, the user device 200 may output detailed information on the item and quantity information on the item corresponding to the order information as shown in FIG. 7.

Referring to FIG. 7, the user device 200 may output the detailed information on the item and the quantity information on the item corresponding to the order information based on the acquisition of the scan input corresponding to the location information (701 and 703). The detailed information on the item output through the region 701 may include a name and an image of the item and identification information on the item, and the quantity information on the item corresponding to the order information and information in which the picker may input a picking quantity of the item corresponding to the quantity information may be output through the region 703.

In a region 705, information for acquiring picking completion information, which is related to an input of confirming picking of the item or canceling the picking of the item according to the picking quantity of the item input by the picker, may be output through the region 703. In this case, a "Place in Bag" button for confirming the picking of the item may be a button which is activated when the picking quantity of the item input by the picker satisfies the quantity information of the item corresponding to the order information, and a "This product is not here" button indicating that the item is out of stock so as to cancel the picking of the item may be a button which is deactivated when the picking quantity of the item input by the picker satisfies the quantity information of the item corresponding to the order information.

In addition, in a region 707, summary information on the next item in a next sequence of the item, for which each information is presented through the regions 701 to 705, is outputted, the summary information may simply include an image of the next item in the next sequence or location information on the next item, and the picker may confirm the image or the location information, identify the next item in the next sequence in advance, and perform preparation for picking the next item in the next sequence.

Figure 8:
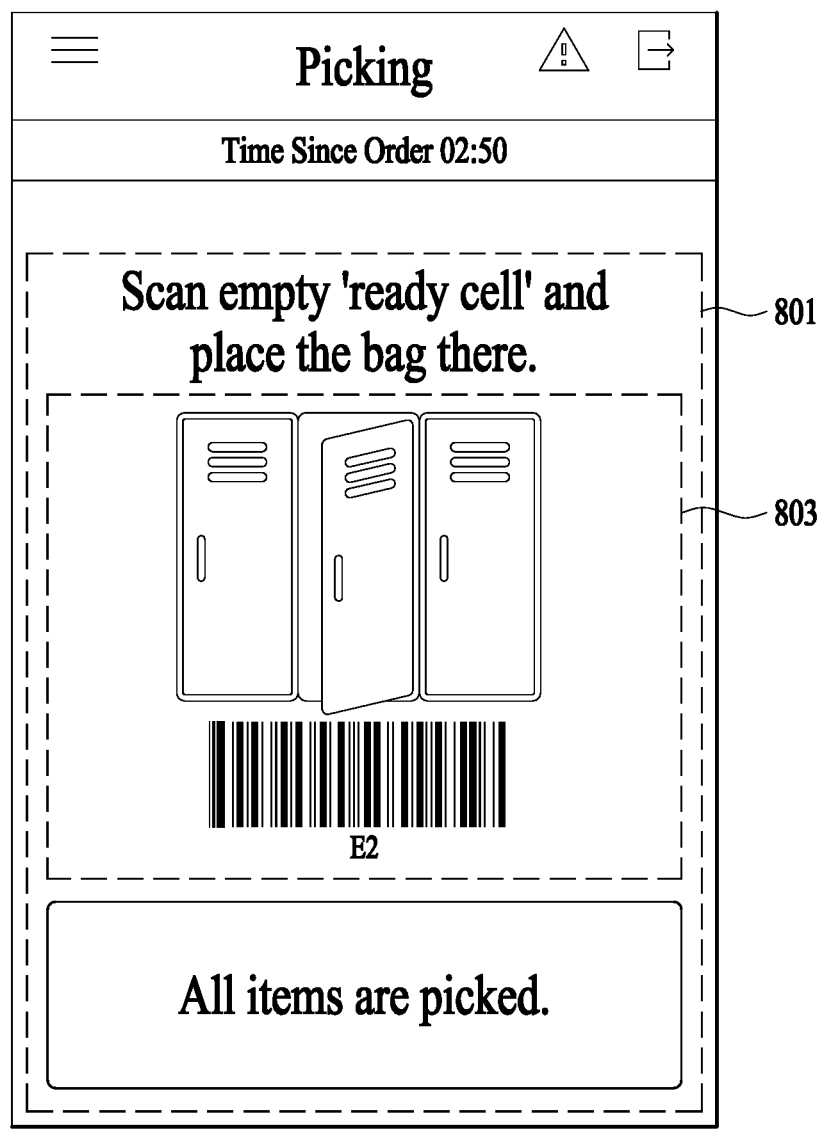
FIGS. 8 to 10 are diagrams illustrating examples in which the user device outputs information on the pickup location assignment for order information to the user based on the operation of the server device according to various example embodiments.
Figure 9:
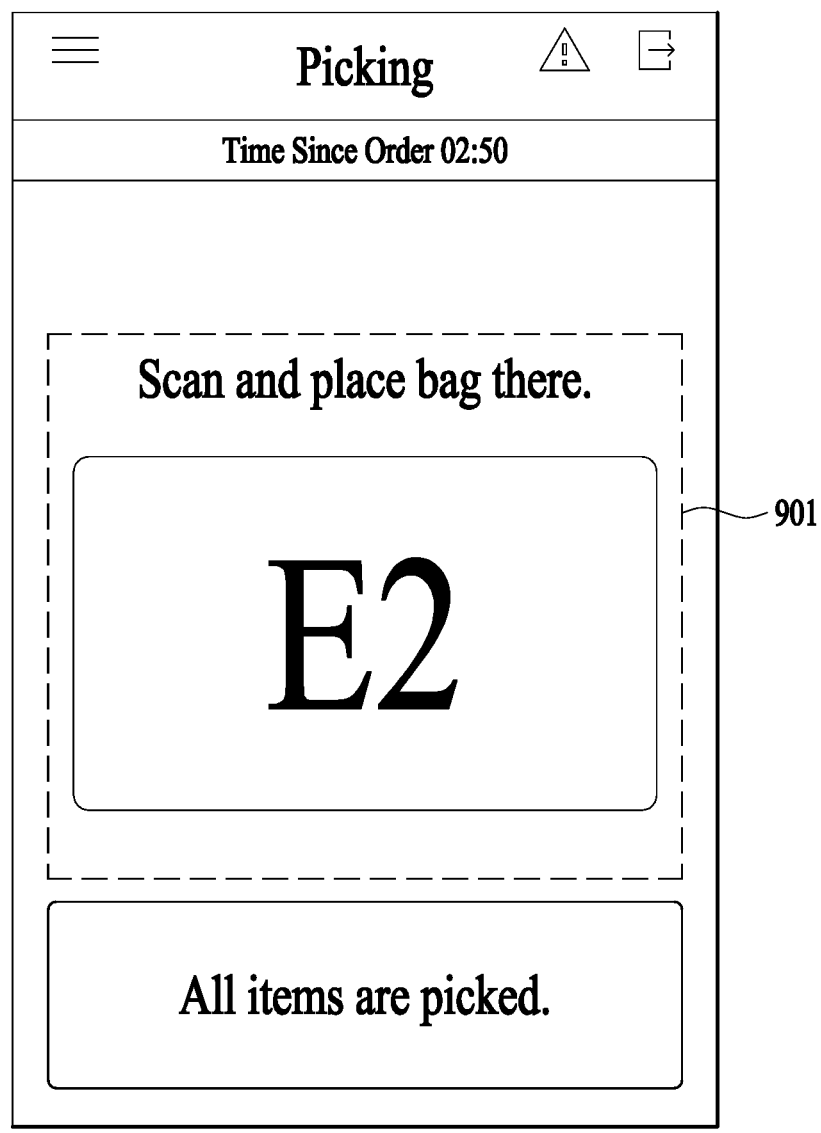
Figure 10:
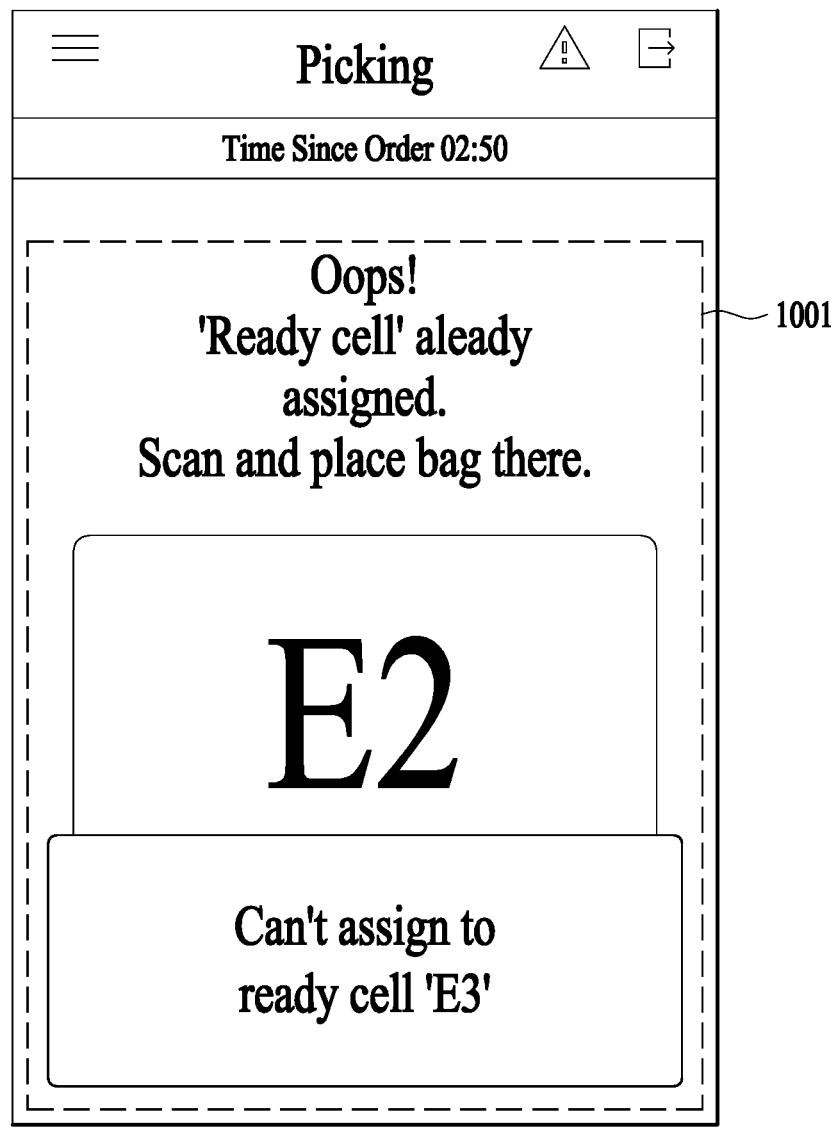

FIGS. 8 to 10 are diagrams illustrating examples in which the user device 200 outputs information on the pickup location assignment for order information to the user based on the operation of the server device 100 according to various example embodiments. Each information output as shown in FIGS. 8 to 10 may be information which is output when the picking work according to FIGS. 6 to 7 is completed for each item included in the item list for the order information of the user.

Referring to FIG. 8, through a region 801, the user device 200 may output information, on which the picking work of all items included in the item list for the order information of the user is completed, and information for scanning a bar code so as to designate a pickup location and informing the picker of placing the item for which the picking work is completed at the pickup location. In addition, in order to designate the pickup location, as shown in a region 803, simple image information on the pickup location and information on a barcode for designating the pickup location may be output. When the picker scans the barcode output through the region 803, a pickup location "E2" may be assigned for the order information of the user.

Meanwhile, in FIG. 9, when a plurality of picking work are assigned for one piece of the order information and the specific pickup location "E2" is already assigned, the user device 200 may be output guide information on the pickup location "E2" which is already assigned to the picker who completes the picking work (901). That is, when the specific pickup location "E2" is already assigned for one piece of the order information by another picker performing different picking work for one piece of the order information, as shown in FIG. 9, the user device 200 may output the guide information on the specific pickup location "E2," which is already assigned, and information for guiding placing the item, for which the picking work is completed, at the pickup location "E2" to the picker.

In FIG. 10, when the plurality of picking work is assigned for one piece of the order information, the user device 200 receives pickup request information on which the picker completes the picking work and a pickup place "E3" is assigned to the picker. However, when another picker completes another picking work for one piece of the order information and is assigned to the pickup location "E2" before the picker performs an input corresponding to the pickup request information, the user device 200 may output information for guiding that the pickup location "E3" cannot be assigned, the guide information on the specific pickup location "E2," which is already assigned, and information for guiding placing the item, for which the picking work is completed, at the pickup location "E2" to the picker who perform an input corresponding to the pickup request information so as to receive assignment of the pickup location "E3" (1001).

Figure 11:
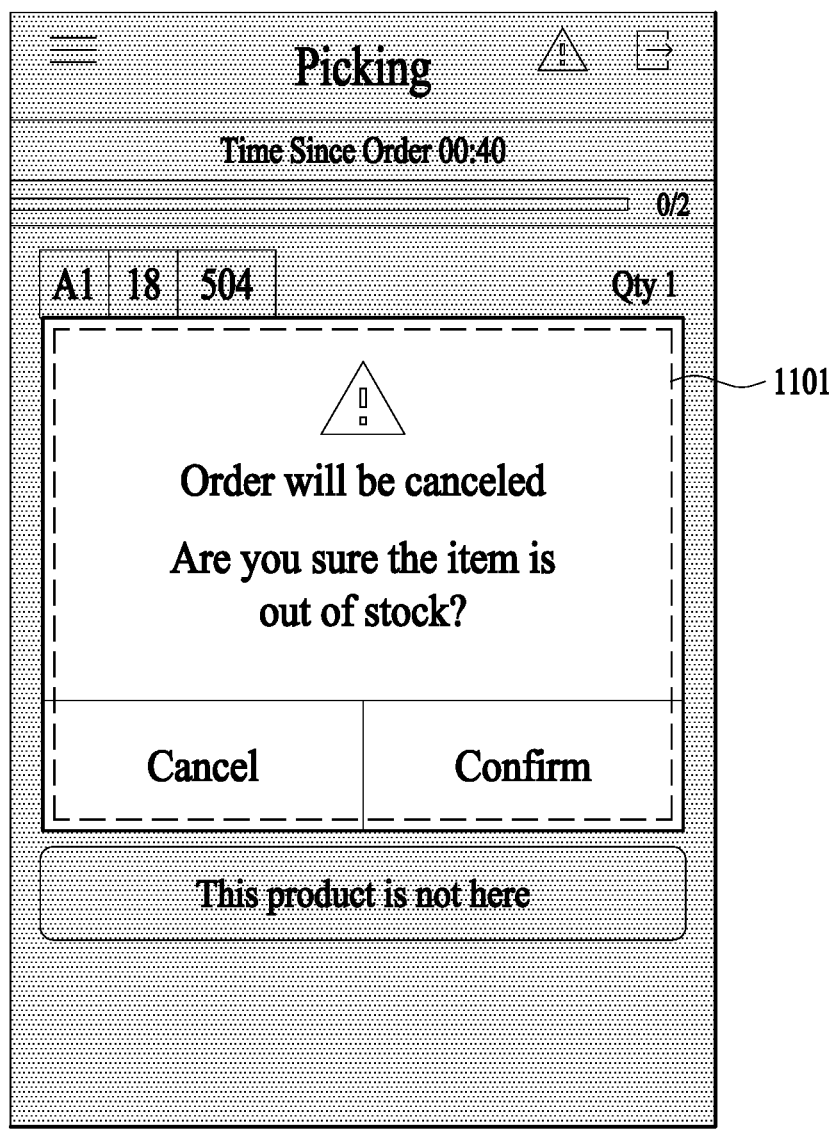
FIGS. 11 and 12 are diagrams illustrating examples in which the user device outputs picking cancellation information on an item to the user based on the operation of the server device according to various example embodiments.
Figure 12:
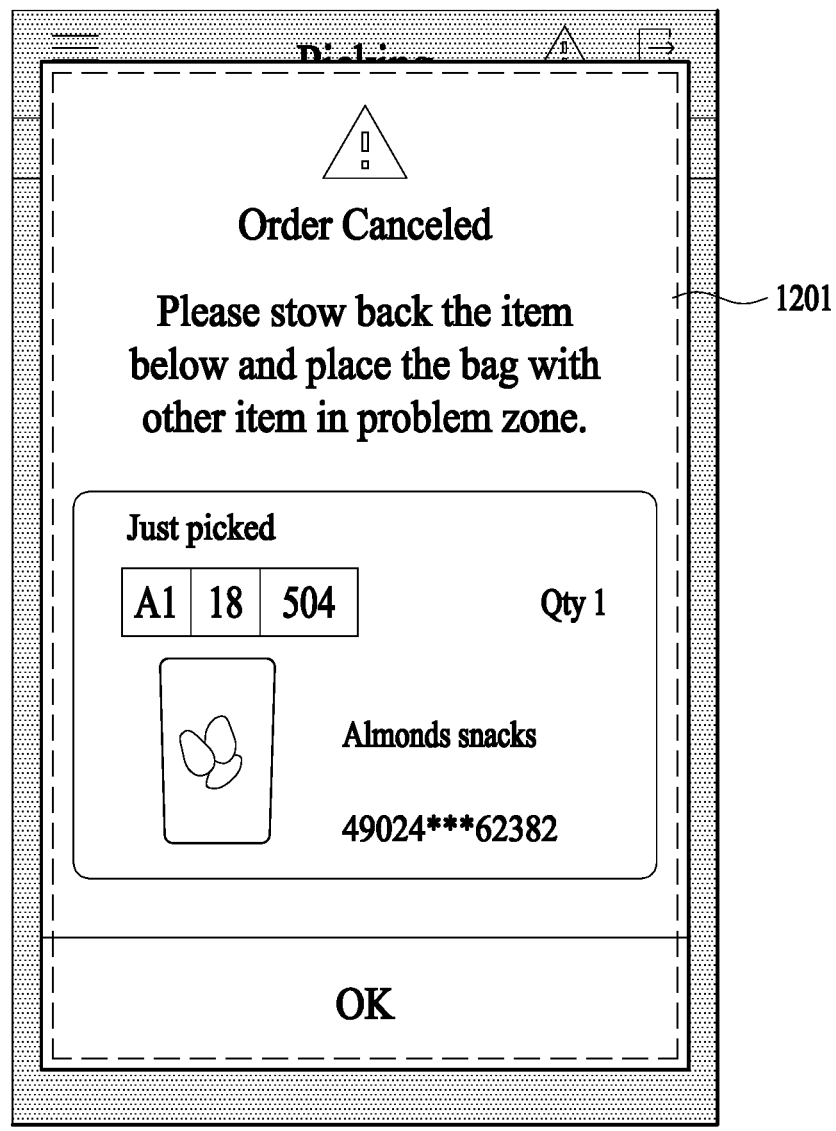

FIGS. 11 and 12 are diagrams illustrating examples in which the user device 200 outputs picking cancellation information on an item to the user based on the operation of the server device 100 according to various example embodiments.

In FIG. 11, picking cancellation information on the item output by the user device 200 may be information provided to the picker based on an input corresponding to the "This product is not here" button indicating that stock of a specific item is not present in order to cancel the picking of the specific item through the region 705 of FIG. 7. That is, when the input corresponding to the "This product is not here" button shown in the region 705 of FIG. 7 is acquired from the picker, the user device 200 may output the picking cancellation information as shown in FIG. 11 (1101).

In FIG. 11, when the picker inputs a "confirm" button in response to the picking cancellation information for the specific item of "Almonds snacks" output by the user device 200, picking of the specific item and picking work corresponding to the order information are canceled, and as shown in FIG. 12, the user device 200 may output information for guiding stowing to specific item to its original location and information for guiding placing items, which are already picked prior to the specific item, in a problem zone which is separately managed (1201). In this case, since the specific item is not picked, the specific item may be determined as being stowed back in its original location or being fully stowed from the beginning, and thus an initial stock quantity of the specific item may be managed as a current stock quantity of the specific item. On the other hand, since the items which are already picked may need to undergo a process of confirming a status of each item before stowing back each item to normal stock, each item which is picked may be managed through a separate problem zone, and a quantity obtained by subtracting the picking quantity of each item or the quantity of each item managed in the separate problem zone from the initial stock quantity of each item may be managed as the current stock quantity of each item. In this case, in FIGS. 6 to 12, information on an elapsed real time from a timing point when the order information is acquired may be displayed in an upper part of a screen output by the user device 200.

The UI/UX for the user device 200 of FIGS. 6 to 12 and the operation of the user device 200 may be performed in connection with the operation of the server device 100 described with reference to FIGS. 3 to 5, and the example of the UI/UX shown in FIGS. 6 to 12 is one example for implementation of the present disclosure, and various embodiments of the present disclosure are not limited to the UI/UX form of FIGS. 6 to 12 and may be implemented according to all types of UI/UX capable of implementing various examples of the present disclosure.

The example embodiments of the present disclosure disclosed in the present specification and the drawings are merely provided for specific examples in order to easily describe the technical contents of the present disclosure and help understanding of the present disclosure and are not intended to limit the scope of the present disclosure. That is, it is obvious to those skilled in the art to which the present disclosure pertains that other modifications can be implemented based on the technical spirit of the present disclosure. In addition, each of the example embodiments may be operated in combination with each other, as necessary. For example, some of all the example embodiments of the present disclosure may be combined with each other to be implemented by a system.

In addition, a method according to a system of the present disclosure may be implemented in the form of a program command which is executable through various computer means and be recorded in a computer-readable medium.

As described above, the various example embodiments of the present disclosure may be implemented as computer readable codes on a computer readable recording medium in a particular aspect. The computer readable recording medium is any data storage device capable of storing data which can be read by a computer system. Examples of the computer readable recording medium may include ROMs, RAMs, compact disc (CD)-ROMs, magnetic tapes, floppy disks, optical data storage devices, and carrier waves (including data transmission over the Internet). In addition, the computer readable recording medium may be distributed over computer systems connected to a network so that the computer readable codes are stored and executed in a distributed manner. In addition, functional programs, codes, and code segments for achieving the various example embodiments of the present disclosure may be easily construed by programmers skilled in the field to which the present disclosure is applied.

In addition, it may be appreciated that apparatuses and methods according to the various example embodiments of the present disclosure may be realized in the form of hardware, software, or a combination thereof. For example, regardless of whether to be erasable or rewritable, the software may be stored in a volatile or non-volatile storage device such as a ROM, a memory such as a RAM, a memory chip, a device, or an integrated circuit, a storage medium which is optically or magnetically recordable and, simultaneously, is read by a machine (for example, a computer), such as a CD, a digital versatile disc (DVD), a magnetic disk, or a magnetic tape. It is appreciated that the methods according to the various example embodiments of the present disclosure may be implemented by a computer including a controller and a memory or a vehicle including the memory or the computer, and the memory is an example of a machine-readable storage medium suitable for storing a program including instructions and programs for implementing the example embodiments of the present disclosure.

Accordingly, the present disclosure includes a program including codes for implementing the apparatus or method described in the appended claims of the present specification, and a storage medium which stores the program and is readable by a machine (a computer or the like). In addition, the program may be transmitted electronically through any medium such as a communication signal transmitted through a wired or wireless connection, and the present disclosure suitably includes an equivalent of the medium.

Although the description has been made with reference to the example embodiments of the present disclosure, the example embodiments of the present disclosure disclosed in the present specification and the drawings are merely provided for specific examples in order to easily describe the technical contents of the present disclosure and help understanding of the present disclosure and are not intended to limit the scope of the present disclosure. While the above-described example embodiments according to the present disclosure are merely illustrative, and it should be understood that various modifications and equivalent embodiments can be derived by those who skilled in the art. Accordingly, the true technical scope of the present disclosure should be determined by the appended claims.

What is claimed is:

1. A method of providing information related to a service by an electronic apparatus including a processor and a communication part, comprising:
   receiving, via the communication part, an item list including one or more items;
   parsing, via the processor, the item list unto two or more work assignments;
   assigning, via the processor from a plurality of terminals of pickers, a first work assignment to a first terminal of a first picker and assigning a second work assignment to a second terminal of a second picker;
   providing, via the communication part to the first terminal of the first picker, information on a first item included in the first work assignment and a first location information on a location of the first item;
   acquiring, via the communication part from the first terminal, a first input corresponding to the first location information;
   providing, via the communication part to the first terminal, detailed information on the first item and quantity information on the first item, in response to the first input;
   acquiring, via the communication part from the first terminal, first picking completion information on the first item;
   determining, via the processor and based on the first picking completion information, whether the first work assignment is complete;
   providing, via the communication part to the first terminal and based on a determination that the first work assignment is complete, first pickup request information;
   receiving, via the communication part and based on the provided first pickup request information, a second input from the first terminal;
   assigning, via the processor and based on the second input, a first pickup location for the items in the first work assignment;
   providing, via the communication part to the first terminal, the first pickup location;
   receiving, via the communication part from the second terminal, second picking completion information regarding a third item;
   determining, via the processor and based on the second picking completion information, whether the second work assignment is complete;
   providing, via the communication part to the second terminal and based on a second determination that the second work assignment is complete, a second pickup request information;
   receiving, via the communication part and based on the provided second pickup request information, a third input from the second terminal;
   providing, via the communication part to the second terminal, the first pickup location;
   receiving, via the communication part from the second terminal, a fourth input regarding the first pickup location; and
   providing, via the communication part to a terminal of a courier and based on the four input, the item list and information on the assigned first pickup location.

2. The method of claim 1, wherein the first picking completion information includes:
   information on which the first picker inputs a picking quantity of the first item in response to the quantity information on the first item; and information on which the first picker inputs one of information for confirming picking of the first item and information for canceling the picking of the first item based on the inputted picking quantity.

3. The method of claim 1, wherein the information on the first item and the first location information are provided based on first sequence information on the first item among sequence information on the one or more items.

4. The method of claim 3, wherein the sequence information is determined based on a weight of each of the one or more items.

5. The method of claim 3, wherein the sequence information is determined based on a minimum picking path for the first picking work assignment.

6. The method of claim 3, the method further comprising:
when information for confirming the picking of the first item is input based on the first picking completion information, providing, to the first terminal, information on a second item having second sequence information following the first sequence information and second location information on a location of the second item being stowed;
acquiring, from the first terminal, a third input corresponding to the second location information;
providing, to the terminal, detailed information on the second item and quantity information on the second item corresponding to the item list, in response to the third input; and
acquiring, from the terminal, second picking completion information on the second item.

7. The method of claim 6, wherein, when picking completion information on all the one or more items is acquired, picking of the one or more items is completed.

8. The method of claim 6, the method further comprising:
when information for canceling picking of the second item is input based on the second picking completion information, providing, to the terminal, picking cancellation information for canceling the first picking work,
wherein the first picking work is canceled according to a fourth input of the first picker corresponding to the picking cancellation information.

9. The method of claim 8, the method further comprising:
confirming a picking quantity input for the first item through the first picking completion information;
configuring a quantity, which is obtained by subtracting the input picking quantity from an initial stock quantity of the first item, as a current stock quantity for the first item; and
configuring an initial stock quantity of the second item as a current stock quantity for the second item.

10. The method of claim 9, wherein, when a status of the first item for which picking is completed is determined as being normal based on the input picking quantity, the current stock quantity for the first item is reconfigured to be equal to the initial stock quantity of the first item.

11. The method of claim 6, wherein, when the detailed information on the first item and the quantity information on the first item are provided, summary information on the second item is displayed in a lower part of a region in which the detailed information on the first item and the quantity information on the first item are displayed based on the second sequence information.

12. The method of claim 1, the method further comprising:
providing, to the first terminal, information on an elapsed real time from a timing point when the item list is acquired.

13. The method of claim 1, wherein, when picking of an item is not confirmed within a predetermined period of time after information on the item having high priority sequence information among the one or more items and location information on a location of the item being stowed are provided, the first picking work assignment is canceled.

14. The method of claim 1, the method further comprising:
when picking of all the remaining some items is completed, providing, to the second terminal, guide information on the first pickup location based on that the first pickup location is assigned to the item list.

15. The method of claim 1, the method further comprising:
when picking of all the remaining some items is completed, providing, to the second terminal, pickup request information for assigning a pickup location for the item list based on that the first pickup location is not assigned for the item list;
assigning a second pickup location for the item list based on a sixth input of the second picker corresponding to the pickup request information; and
providing, to the terminal of the courier, the item list and information on the assigned second pickup location.

16. The method of claim 15, the method further comprising:
after the pickup request information is provided and before the sixth input of the second picker is acquired, when the first pickup location is assigned based on the second input of the first picker corresponding to the first pickup request information, providing, to the second terminal, guide information on the first pickup location in response to the sixth input of the second picker.

17. The method of claim 1, wherein information for informing whether both the first picking work and the second picking work assignment are completed is provided to the terminal of the courier.

18. An electronic apparatus for providing information related to a service, comprising:
a processor;
a communication part controlled by the processor; and
one or more memories configured to store one or more instructions,
wherein, when executed, the one or more instructions control the processor to perform:
receiving, via the communication part, an item list including one or more items;
parsing the item list into two or more work assignments;
assigning, from a plurality of terminals of pickers, a first work assignment to a first terminal of a first picker and assigning a second work assignment to a second terminal of a second picker;
providing, via the communication part to the first terminal of the first picker, information on a first item included in first work assignment and a first location information on a location of the first item;
acquiring, via the communication part from the first terminal a first input corresponding to the first location information;

providing, via the communication part to the first terminal, detailed information on the first item and quantity information on the first item, in response to the first input;

acquiring, via the communication part from the first terminal, first picking completion information on the first item;

determining, based on the first picking completion information, whether the first work assignment is complete;

providing, via the communication part to the first terminal and based on a determination that the first work assignment is complete, first pickup request information;

receiving, via the communication part and based on the provided first pickup request information, a second input from the first terminal;

assigning, based on the second input, a first pickup location for the items in the first work assignment;

providing, via the communication part to the first terminal, the first pickup location;

receiving, via the communication part from the second terminal, second picking completion information regarding a third item;

determining, based on the second picking completion information, whether the second work assignment is complete;

providing, via the communication part to the second terminal and based on a second determination that the second work assignment is complete, a second pickup request information;

receiving, via the communication part from the second terminal, a fourth input regarding the first pickup location; and providing, via the communication part to a terminal of a courier, the item list and information on the assigned first pickup location.

\* \* \* \* \*